United States Patent
Schmookler

Patent Number: 5,539,332
Date of Patent: Jul. 23, 1996

[54] ADDER CIRCUITS AND MAGNITUDE COMPARATOR

[75] Inventor: Martin S. Schmookler, Austin, Tex.

[73] Assignee: International Business Machines Corporation, Armonk, N.Y.

[21] Appl. No.: 331,436

[22] Filed: Oct. 31, 1994

[51] Int. Cl.⁶ ................................................. G05B 1/00
[52] U.S. Cl. ..................... 326/53; 364/768; 340/146.2
[58] Field of Search ........................ 340/146.2; 364/768, 364/769, 787; 326/53

[56] References Cited

U.S. PATENT DOCUMENTS

| | | | |
|---|---|---|---|
| 3,656,109 | 4/1972 | Conway | 340/146.2 |
| 4,163,211 | 7/1979 | Miura | 340/146.7 |
| 4,225,849 | 9/1980 | Lai | 340/146.2 |
| 4,446,452 | 5/1984 | Munter | 340/146.2 |
| 4,541,067 | 9/1985 | Whitaker | 364/716 |
| 4,570,084 | 2/1986 | Griffin et al. | 307/452 |
| 4,607,176 | 8/1986 | Burrows et al. | 307/452 |
| 4,648,059 | 3/1987 | Gregorcyk | 364/769 |
| 4,700,325 | 10/1987 | Ware | 364/768 |
| 4,713,790 | 12/1987 | Kloker | 326/53 |
| 4,728,927 | 3/1988 | Aman | 340/146.2 |
| 4,918,636 | 4/1990 | Iwata et al. | 340/146.2 |
| 4,918,640 | 4/1990 | Heimsch | 364/768 |
| 5,220,306 | 6/1993 | Shimizu | 340/146.2 |
| 5,281,946 | 1/1994 | Van Le | 340/146.2 |

Primary Examiner—Edward P. Westin
Assistant Examiner—Andrew Sanders
Attorney, Agent, or Firm—Mark E. McBurney; Keith L. Hargrove; Andrew J. Dillon

[57] ABSTRACT

An evaluation tree circuit is disclosed that produces a generate, a propagate, and a zero output for use in carry lookahead adders. Another evaluation tree circuit is disclosed that merges the generate, propagate, and zero signals from several adjacent bits or groups of bits. These evaluation trees may be used in self-resetting CMOS or CVSL circuits. They can be used to reduce the number of levels of logic in a carry lookahead adder. They can also be used to form a magnitude comparator, which is also disclosed.

12 Claims, 2 Drawing Sheets 5,539,332

ADDER CIRCUITS AND MAGNITUDE COMPARATOR

BACKGROUND OF THE INVENTION

1. Technical Field

The present invention relates generally to logic circuits for use in adders and comparator units wherein the functional signals propagate, generate and zero are used. More specifically, the present invention relates to an improved logic circuit that merges more than two groups of propagate, generate, and zero functions, thereby reducing the number of required levels. It also relates to an improved logic circuit that forms the propagate, generate, and zero functions of a two-bit group. It also relates to an improved comparator that is comprised of these circuits.

2. Description of the Related Art

Digital logic circuits are well known in the art. They are used in such circuits as adders and comparators. In an adder circuit, the first level of adders typically forms the functions propagate, generate and zero (P, G, and Z, respectively). The next level of logic merges these functions for two-bit groups and subsequent levels merge pairs of these functions from the previous level to form the P, G, and Z functions of larger and larger groups, doubling at each level. One way of reducing the number of levels in the adder is to be able to merge more than two groups at a time.

Another commonly used digital circuit is a magnitude comparator. Magnitude comparators compare two numbers, A and B, and activate one of three output signals corresponding to whether A is greater than B, A is equal to B, or A is less than B. In many cases, it is important that this circuit be fast. It is also desirable that it be small, thus occupying a small portion of chip real estate. One method of minimizing the size of the comparators is to reduce the number of transistor devices used.

Accordingly, what is needed in the art is an improved digital logic circuit that has a faster operation time, reduces the amount of chip real estate required, and is simple in design. What is further needed is an adder circuit or magnitude comparator, which relies on the improved logic circuit.

SUMMARY OF THE INVENTION

It is therefore one object of the present invention to provide logic circuits for use in adders or comparator units wherein the propagate, generate and zero functions are used.

It is another object of the present invention to provide an improved logic circuit that forms the propagate, generate, and zero functions of a two-bit group.

It is another object of the present invention to provide an improved logic circuit that merges more than two groups of propagate, generate, and zero functions, thereby reducing the number of required levels.

It is another object of the present invention to provide an improved comparator comprised of these logic circuits.

The foregoing objects are achieved as is now described. According to the present invention, an evaluation tree circuit is disclosed that has a generate, a propagate, and a zero output used for carry look-ahead adders. The circuit may be used in a self-resetting CMOS or CVSL (cascode voltage switch logic) circuit. The evaluation tree circuits use several branches having a variable number of input node complement pairs. Each branch has only one node active at any time to prevent system errors.

These circuits can be used to reduce the number of levels of logic in a carry lookahead adder. They can also be used to form a magnitude comparator.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
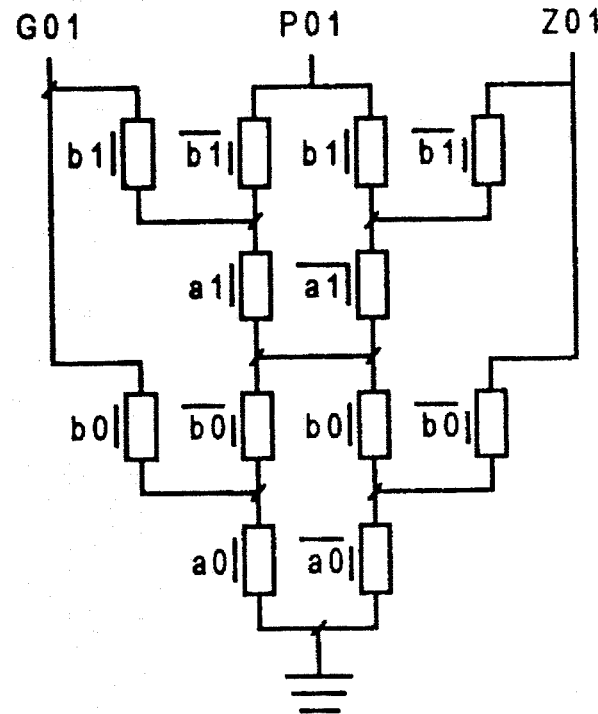
FIG. 1 depicts a schematic diagram of an N-device logic tree for implementing the propagate, generate and zero functions for two bits of an adder.

With reference now to the figures and in particular with reference to FIG. 1, a schematic diagram of an n-device logic tree 10 for use in dynamic circuits such as, for example, self-resetting CMOS or CVSL (pre-charged cascode voltage switch logic) circuits is depicted. Logic tree 10 implements all three functions of "generate, propagate, and zero" (G, P, and Z, respectively) for a two-bit group in one level from the adder inputs. The functional outputs are generate G01, propagate P01, and zero Z01. The inputs are the adder input nodes and are bits a0, a1, b0, b1, and their respective complements. Inputs a0 and b0 are the inputs for the more significant bit (MSB) and a1 and b1 are the inputs for the least significant bit (LSB). For an n-bit adder, bit 0 is the most significant bit (MSB) and bit (n−1) is the least significant bit (LSB). The inputs are connected in such a way that each input device is always coupled in parallel to its respective complement device, for example, the a0 device is coupled in parallel to its complement $\overline{a0}$ device, which are both further tied to ground. The outputs of the a0 device and its complement branch are arranged such that both are coupled to separate b0 and $\overline{b0}$ devices. This leads to there being two b0 devices and two $\overline{b0}$ devices. The outputs of the first $\overline{b0}$ device and the second b0 device are tied together and then further connected to the parallel pair of a1 and $\overline{a1}$ devices. The output of the first b0 device is tied to G01 while the output of the second $\overline{b0}$ device is tied to Z01. The outputs of the a1 and $\overline{a1}$ devices are connected to a first device pair of b1 complements and a second device pair of b1 complements, respectively. The output of the first b1 device is tied to G01 while the outputs of the first $\overline{b1}$ device and second b1 device are tied together and form P01. Finally, the output of the second $\overline{b1}$ device is tied to the output of the second $\overline{b0}$ device and forms Z01.

By sharing devices in a common tree, the number of devices is reduced resulting in a reduction in chip area during processing. Further, the capacitive loading of the adder on its inputs is reduced.

The output nodes shown in FIG. 1 each has negative polarity, (active low), whereas the input nodes of the circuit require signals that are positive (active high). The self-resetting CMOS or CVSL circuits provide p-gate pullup devices to precharge those nodes and inverting buffers to drive the output loads and correct the polarity. In the progression from the bottom towards the top, the branches are always orthogonal, meaning only one element can be active at a time, which insures that no sneak paths exist to cause malfunction. The Boolean equations for the functions implemented by the circuit in FIG. 1 are:

$$G01 = a0*b0 + (a0 \text{ XOR } b0)*a1*b1$$

$$P01 = (a0 \text{ XOR } b0)*(a1 \text{ XOR } b1)$$

$$Z01 = \overline{a0}*\overline{b0} + (a0 \text{ XOR } b0)*\overline{a1}*\overline{b1}$$

Figure 2:
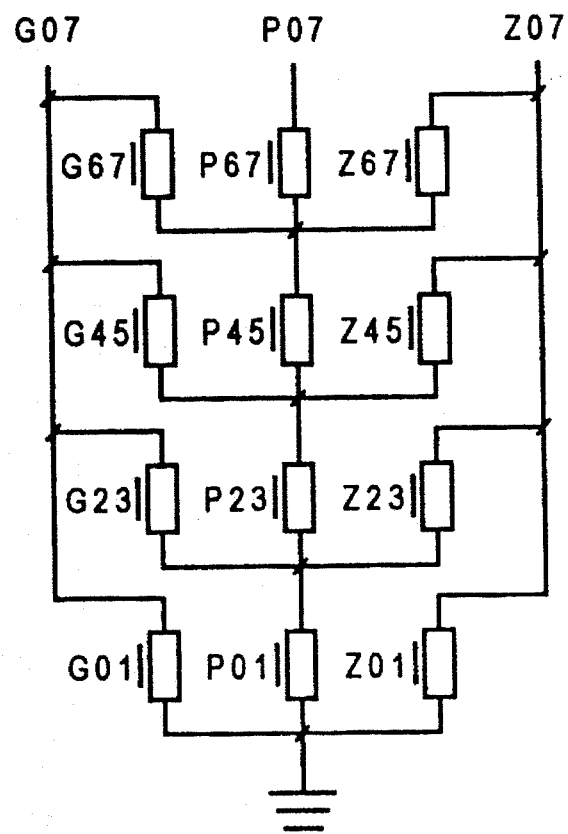
FIG. 2 is a schematic diagram of an N-device logic tree for merging the propagate, generate, and zero functions from four two-bit adder groups.

FIG. 2 illustrates an n-device logic tree that merges the "generate, propagate, and zero" functions from four two-bit groups in one level. Each two-bit group is based upon the same evaluation tree shown in FIG. 1. The first set of function outputs for the first two-bit group is represented by G01, P01, and Z01, meaning generate, propagate and zero, respectively. Likewise, the second set of functions of the two-bit groups are represented by G23, P23, and Z23. The third set of functions of the two-bit groups is represented by G45, P45, and Z45. Finally, the fourth set of functions from the fourth two-bit group is represented by G67, P67, and Z67. The output for the entire level is represented by outputs G07, P07, and Z07.

As can be seen in FIG. 2, the input devices for each set of functions are tied together, with the devices for G01, P01, and Z01, being tied to ground. The output for each generate function device is then tied to G07 while the output for each zero function device is tied to Z07. The output for each propagate function device is tied to the devices for the set of functions of the next two-bit group. For example, the P01 device is tied to the devices for G23, P23, and Z23. The output of the P23 device is tied to the devices for G45, P45, and Z45. The output for the P45 device is tied to the devices for G67, P67, and Z67. Finally, the output of the P67 device is the function P07. This stacking arrangement of rows of devices for merging more groups can continue and is only limited by performance or other technology considerations.

Again, as one proceeds up the tree from the bottom devices, the branches are always orthogonal, thus preventing sneak paths from occurring, which would lead to malfunction. The Boolean equations for the functions implemented by the circuit in FIG. 2 are:

$$G07 = G01 + P01*G23 + P01*P23*G45 + P01*P23*P45*G67$$

$$P07 = P01*P23*P45*P67$$

$$Z07 = Z01 + P01*Z23 + P01*P23*Z45 + P01*P23*P45*Z67$$

Figure 3:
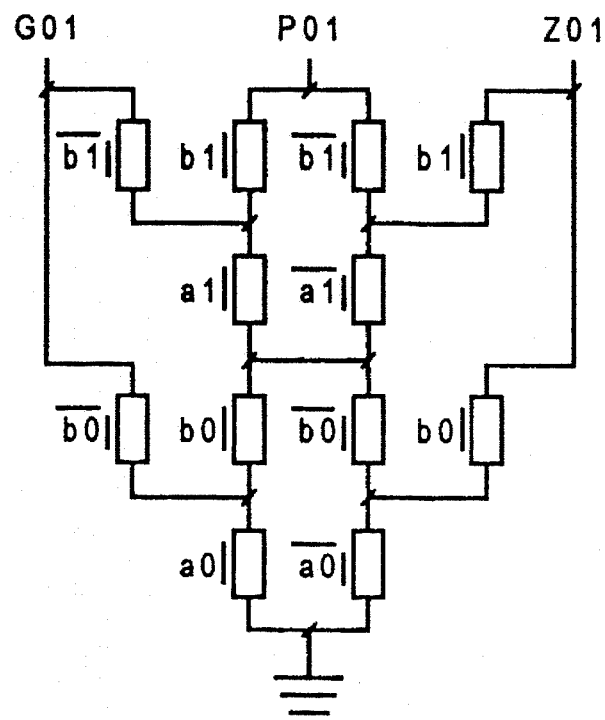
FIG. 3 illustrates the use of the circuit in FIG. 1 in a comparator, by interchanging the true and complement inputs of operand b.
Figure 4:
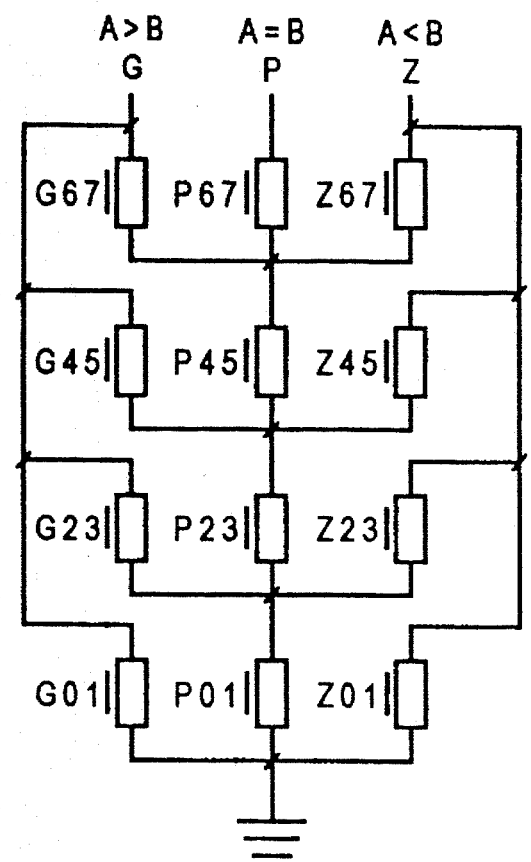
FIG. 4 illustrates the use of the circuit in FIG. 2 in a comparator, showing the correspondence between the adder carry lookahead signals and the comparator output signals.

The logic trees of FIGS. 1 and 2 may also be used as a magnitude comparator 30 as depicted in FIGS. 3 and 4. Given two positive integers a and b, if a is added to the ones complement of b, then there will be a carryout if and only if a is greater than b. Similarly, one can determine if a is less than b by adding the complement of a to b and detecting if there is a carryout. If both are false, then a must be equal to b. There is a faster way, however, to detect the equal case, which is by ANDing the NOT-XORs of each bit together. This is similar to the case in adders where in the adder, an input carry (or no carry) is propagated from its least significant bit position to the adder's carry output. Thus the functions required of a magnitude comparator can be implemented using the circuits within a carry look ahead adder that are needed to determine the output carry, but without the circuits needed for the sum. If the inputs to the adder are a and the complement of b, then the generate function also represents the function a>b, the propagate function is a=b, and the zero function is a<b. FIGS. 3 and 4 depict an eight-bit comparator. The input operands are a and b consisting of a0–a7 and b0–b7, respectively. The functions G, P, and Z for each two-bit group are generated using the same evaluation tree as that illustrated in FIG. 1, except that the b inputs are complemented: e.g. $\overline{b0}$ in place of b0 and b0 in place of $\overline{b0}$, as illustrated in FIG. 3. The output stage is shown in FIG. 4.

The magnitude comparator may also be used with "twos complement" fixed point integers; however, the sign bits must be inverted because in the twos complement representation, the sign bit has a negative weight.

While the invention has been particularly shown and described with reference to a preferred embodiment, it will be understood by those skilled in the art that various changes in form and detail may be made therein without departing from the spirit and scope of the invention.

I claim:

1. An evaluation circuit having a first input and a second input and a propagate, a generate, and a zero output, comprising:

a first branch coupled to ground comprising a pair of first input devices for a true and complement of a first bit of said first input;

a second pair of branches, coupled to said first branch, each comprising a pair of second input devices for a first bit of said second input;

a third branch, coupled to said second pair of branches, comprising a pair of input devices for a second bit of said first input;

a fourth pair of branches, coupled to said third branch, each comprising a pair of input devices for a second bit of said second input;

said generate output being formed by output from said second and fourth pairs of branches and having the boolean function equivalent to a0*b0 +(a0 XOR b0)*a1*b1;

said propagate output being formed by outputs from said fourth pair of branches and having the boolean function equivalent to (a0 XOR b0)*(a1 XOR b1);

said zero output being formed by outputs from said second and fourth pairs of branches and separate from said generate output and having the boolean function equivalent to $\overline{a1}*\overline{b0}+(a0 \text{ XOR } b0)*\overline{a1}*\overline{b1}$.

2. The invention according to claim 1 wherein each branch has only a single input device active at any time.

3. The invention of claim 1 wherein each output device provides a signal having a negative polarity and each input device receives a signal having a positive polarity and further comprising inverting buffers coupled to each output to change the polarity of said output signal.

4. An evaluation tree circuit comprising a two-bit group of input devices from an adder circuit and having outputs forming generate, propagate, and zero signals, the evaluation tree circuit comprising:

a first branch having a pair of first input devices, each device being the complement of the other, coupled in parallel;

a second branch having a first and second pair of second input devices, each device being the complement of the other, said first pair of second input devices coupled to one of said first input devices and said second pair of input devices coupled to the complement of said first input devices;

a third branch having a pair of third input devices, each device being the complement of the other, coupled in parallel to the complement device of said first pair of second input devices and to one device of said second pair of second input devices;

a fourth branch having a first and second pair of fourth input devices, each device being coupled in parallel to the complement of the other in said pairs, said first pair of fourth input devices coupled to one of said third input devices and said second pair of input devices coupled to the complement of said third input devices;

the other of said first pair of said second input devices being coupled to one of said first pair of fourth input devices thereby forming said generate output, the complement of said first pair of said fourth input devices and one of said second pair of said fourth input devices being coupled together to form said propagate output, and the complement of said second pair of fourth input devices being coupled to the complement of said second pair of second input devices to form said zero output.

5. The invention according to claim 4 wherein each branch has only a single device active at any time.

6. The invention of claim 4 wherein each output device provides a signal having a negative polarity and each input device receives a signal having a positive polarity and further comprising inverting buffers coupled to each output device to change the polarity of said output signal.

7. An evaluation tree circuit for merging the generate, propagate and zero signals from n adjacent subgroups to form the generate, propagate and zero output signals of a larger group, the circuit comprising:

n branches having a first branch coupled to ground, each said branch comprising a set of input devices for the generate, propagate and zero signals for said subgroup, said signals to said first branch coupled to a first subgroup corresponding to the most significant bits of said larger group;

each subsequent branch coupled to the propagate device of a previous branch, each said subsequent branch comprising a set of input devices for the generate, propagate and zero signals of a next subgroup, less significant than the subgroup whose signals are coupled to said previous branch;

said generate output being formed by the outputs from the generate devices of each of said n branches;

said propagate output being formed by the output from the propagate device of a last branch of said n branches;

said zero output being formed by the outputs from the zero devices of each of said n branches.

8. The invention according to claim 7 wherein each branch has only a single input device active at any time.

9. A magnitude comparator circuit for determining whether a first number having 2n bits is greater than, equal to, or less than a second number also having 2n bits, wherein the numbers are positive integers, the circuit comprising:

n evaluation circuits, one evaluation circuit for each 2-bit group;

said first number being added to the one's complement of said second number in said n evaluation circuits;

an evaluation tree circuit for merging the outputs from said n evaluation circuits, the generate output of said evaluation circuit corresponding to the signal for the first number greater than the second, the propagate output of said evaluation circuit corresponding to the signal for the first number equal to the second, the zero output of said evaluation circuit corresponding to the signal for the first number less than the second.

10. The invention according to claim 9 wherein said numbers are twos complement fixed point integers, each having a sign bit that is inverted during comparing.

11. The invention according to claim 9 wherein said evaluation circuit has a propagate, a generate, and a zero output, and comprises:

a first branch coupled to ground comprising a pair of first input devices for a true and complement of a first bit of said first input;

a second pair of branches, coupled to said first branch, each comprising a pair of second input devices for a first bit of said second input;

a third branch, coupled to said second pair of branches, comprising a pair of input devices for a second bit of said first input;

a fourth pair of branches, coupled to said third branch, each comprising a pair of input devices for a second bit of said second input;

said generate output being formed by output from said second and fourth pairs of branches and having the boolean function equivalent to $a0*\overline{b0} +(a0 \text{ XOR } \overline{b0})*a1*\overline{b1}$;

said propagate output being formed by outputs from said fourth pair of branches and having the boolean function equivalent to $(a0 \text{ XOR } \overline{b0})*(a1 \text{ XOR } \overline{b1})$;

said zero output being formed by outputs from said second and fourth pairs of branches and separate from said generate output and having the boolean function equivalent to $\overline{a0}*b0+(a0 \text{ XOR } \overline{b0})*\overline{a1}*b1$.

12. The invention according to claim 9 wherein said evaluation tree circuit has a generate output to signal that the first number is greater than the second, a propagate output to signal that they are equal, and a zero output to signal that the first number is less than the second, the said evaluation tree circuit comprising:

n branches having a first branch coupled to ground, each said branch comprising a set of input devices for the generate, propagate and zero signals for said subgroup, said signals to said first branch coupled to a first subgroup corresponding to the most significant bits of said larger group;

each subsequent branch coupled to the propagate device of a previous branch, each said subsequent branch comprising a set of input devices for the generate, propagate and zero signals of a next subgroup, less significant than the subgroup whose signals are coupled to said previous branch;

said generate output being formed by the outputs from the generate devices of each of said n branches;

said propagate output being formed by the output from the propagate device of a last branch of said n branches;

said zero output being formed by the outputs from the zero devices of each of said n branches.

\* \* \* \* \*